(12) United States Patent
Morinaga (10) Patent No.: US 10,509,115 B2
(45) Date of Patent: Dec. 17, 2019

(54) POSITION ESTIMATION METHOD, POSITION ESTIMATION DEVICE, AND POSITION ESTIMATION SYSTEM

(71) Applicant: LAPIS SEMICONDUCTOR CO., LTD., Kanagawa (JP)

(72) Inventor: Tomoya Morinaga, Kanagawa (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

(21) Appl. No.: 15/957,569

(22) Filed: Apr. 19, 2018

(65) Prior Publication Data
US 2018/0306910 A1 Oct. 25, 2018

(30) Foreign Application Priority Data

Apr. 20, 2017 (JP) .................. 2017-084041

(51) Int. Cl.
| | |
|---|---|
| *H04W 64/00* | (2009.01) |
| *G01S 11/06* | (2006.01) |
| *G01S 5/02* | (2010.01) |
| *G01S 5/14* | (2006.01) |

(52) U.S. Cl.
CPC ............. *G01S 11/06* (2013.01); *G01S 5/0205* (2013.01); *G01S 5/0268* (2013.01); *G01S 5/14* (2013.01)

(58) Field of Classification Search
CPC ..... H04W 64/00; H04W 4/02; H04W 64/006; H04W 72/04; H04W 76/30; H04W 48/04; H04W 4/023; H04W 4/029; H04W 52/0264; H04W 52/0277; H04W 52/0283; H04M 15/8033; H04M 1/72572
See application file for complete search history.

(56) References Cited

U.S. PATENT DOCUMENTS

| | | | | |
|---|---|---|---|---|
| 2002/0183071 | A1* | 12/2002 | Shioda ................... | G01S 5/021 455/456.1 |
| 2005/0227703 | A1* | 10/2005 | Cheng ................... | H04W 64/00 455/456.1 |
| 2015/0356501 | A1* | 12/2015 | Gorjestani ......... | G06Q 10/0833 705/333 |
| 2016/0232719 | A1* | 8/2016 | Brinig .................. | G01S 5/0027 |

FOREIGN PATENT DOCUMENTS

JP 2016217943 A 12/2016

\* cited by examiner

*Primary Examiner* — Quan M Hua
(74) *Attorney, Agent, or Firm* — Volentine, Whitt & Francos, PLLC (57) ABSTRACT

A position estimation method includes: acquiring, from plural receivers that receive a plural received signal strengths of radio waves transmitted from a transmitter and transmit the plural received signal strengths, the plural received signal strengths; and in a case in which a plural distances between the transmitter and the plural receivers are calculated based on the plural received signal strengths, and a position of the transmitter is estimated by using the plural distances, and in a case in which a distance among the plural distances is smaller than a predetermined threshold, performing a first correction processing by estimating a position of a receiver corresponding to the distance smaller than the threshold as a position of the transmitter.

8 Claims, 9 Drawing Sheets

POSITION ESTIMATION METHOD, POSITION ESTIMATION DEVICE, AND POSITION ESTIMATION SYSTEM

CROSS-REFERENCE TO RELATED APPLICATION

This application claims priority under 35 USC 119 from Japanese Patent Application No. 2017-084041, filed on Apr. 20, 2017, the disclosure of which is incorporated by reference herein.

BACKGROUND

Technical Field

The present disclosure relates to a position estimation method, a position estimation device, and a position estimation system which use received signal strength indicator (RSSI) values.

Related Art

In recent years, there have been demands for the implementation of a system (to be referred to as a "position estimation system" hereinafter) for estimating the position of a specific person or animal (to be referred to as a "search target" hereinafter).

As a method of estimating the positions of search targets, a method using a global positioning system (GPS) is well known. With the recent advent of Internet of Things (IoT) and the like, demands have arisen for more inexpensive position estimation methods with lower power consumption in place of GPS. As such position estimation methods, for example, methods using RSSI values have been studied. Among these methods, a method using a sub-GHz band (to be referred to as a "sub-G" hereinafter, for example, the 920 MHz band) including radio waves with relatively long reach distances has been studied. A position estimation system using RSSI values generally includes a transmitter (for example, a "beacon") that transmits a radio wave and moves together with a search target, and plural receivers (for example, "concentrators") each of which receives a radio wave transmitted from the transmitter and estimates the distance to the search target from the RSSI value of the received radio wave (the received signal strengths).

As a position estimation system using RSSI values, for example, the system disclosed in Japanese Patent Application Laid-Open (JP-A) No. 2016-217943 is known. The position estimation system disclosed in JP-A No. 2016-217943 includes three or more access points and a position estimation device that estimates the position of a portable terminal, based on information concerning the strength of a radio wave from the portable terminal which is received by each access point. The position estimation device includes a decision section and an estimation section. The decision section decides one access point as a receiver that has received a highest strength radio wave in each time zone on the basis of access-specific/time-zone-specific radio wave strength information concerning the strength of a radio wave from the portable terminal, which is received by each access point in each of plural time zones. The estimation section estimates the position of the portable terminal in each of determination target time zones including two or more time zones, on the basis of any combination of receivers that have received highest strength radio waves in each time zone included in the determination target time zones.

There is a possibility of implementing a position estimation system that reduces power consumption and cost by using RSSI values as compared with a system using GPS. However, in the position estimation method using RSSI values, in a case in which the distance between the receiver and the transmitter increases and the strength of a received signal decreases, a measured distance, i.e., an estimated position (to be referred to as an "estimated point" hereinafter), exhibits a larger error. That is, as the fluctuation of estimated points increases, it is sometimes difficult to specify the position of an estimated point or the locus of a point when the point is plotted on a map. In addition, according to the position estimation method using RSSI values, a position is generally estimated by using the RSSI values of three points at receivers arranged at three or more places. However, any estimated point cannot be sometimes calculated due to distance errors. That is, it is not always possible to acquire three proper measurement values, and even in a case in which measurement values are obtained at three points, the values may not be proper values for the estimation of a position based on three points. In order to improve the accuracy of position estimation, studies are also required from this point of view.

The position estimation system according to JP-A No. 2016-217943 is configured to estimate the position of a search target on the basis of any combination of access points corresponding to maximum reception strengths, obtained by dividing a time zone into plural determination target time zones, and measuring reception strengths three times in the determination target time zones. Namely, this system is based on the assumption that three proper measurement values are used without considering the properness of any combination of measurement values itself.

SUMMARY

The present disclosure provides a position estimation method, a position estimation device, and a position estimation system that may estimate a position with higher accuracy in accordance with the characteristics of various measurement values.

A first aspect of the present disclosure is a position estimation method including: acquiring, from plural receivers that receive a plural received signal strengths of radio waves transmitted from a transmitter and transmit the plural received signal strengths, the plural received signal strengths; and in a case in which a plural distances between the transmitter and the plural receivers are calculated based on the plural received signal strengths, and a position of the transmitter is estimated by using the plural distances, and in a case in which a distance among the plural distances is smaller than a predetermined threshold, performing a first correction processing by estimating a position of a receiver corresponding to the distance smaller than the threshold as a position of the transmitter.

A second aspect of the present disclosure is a position estimation device including: a reception section configured to acquire, from plural receivers that receive plural received signal strengths of radio waves transmitted from a transmitter and transmit the plural received signal strengths, the plural received signal strengths; and an estimation section configured to calculate plural distances between the transmitter and the plural receivers based on the plural received signal strengths, and estimate a position of the transmitter by using the plural distances, wherein, in a case in which a distance among the plural distances is smaller than a predetermined threshold, the estimation section performs a correction processing by estimating a position of a receiver corresponding to the distance smaller than the threshold as a position of the transmitter.

A third aspect of the present disclosure is a position estimation system including: a transmitter configured to transmit a radio wave; plural receivers each configured to receive the radio wave, acquire a received signal strength of the radio wave, and transmit the acquired received signal strength; a reception section configured to receive plural received signal strengths transmitted from the receivers; and an estimation section configured to calculate plural distances between the transmitter and the plural receivers based on the plural received signal strengths, and estimate a position of the transmitter by using the plural distances, wherein, in a case in which a distance among the plural distances is smaller than a predetermined threshold, the estimation section performs a correction processing by estimating a position of a receiver corresponding to the distance smaller than the threshold as a position of the transmitter.

According to the above aspects, the present disclosure provides a position estimation method, a position estimation device, and a position estimation system that may estimate a position with higher accuracy in accordance with the characteristics of various measurement values.

BRIEF DESCRIPTION OF THE DRAWINGS

Exemplary embodiments will be described in detail based on the following figures, wherein.

DETAILED DESCRIPTION

Embodiments for implementing the present disclosure will be described in detail below with reference to the accompanying drawings.

[First Exemplary Embodiment]

A position estimation method, a position estimation device, and a position estimation system according to this exemplary embodiment will be described with reference to FIGS. 1 to 5. In the present disclosure, a position estimation target (search target) or a field (region) to which this system is applied are not specifically limited. This exemplary embodiment will exemplify a form in which a search target is a domestic animal such as a cow, and an application field is a grazing land.

Figure 1:
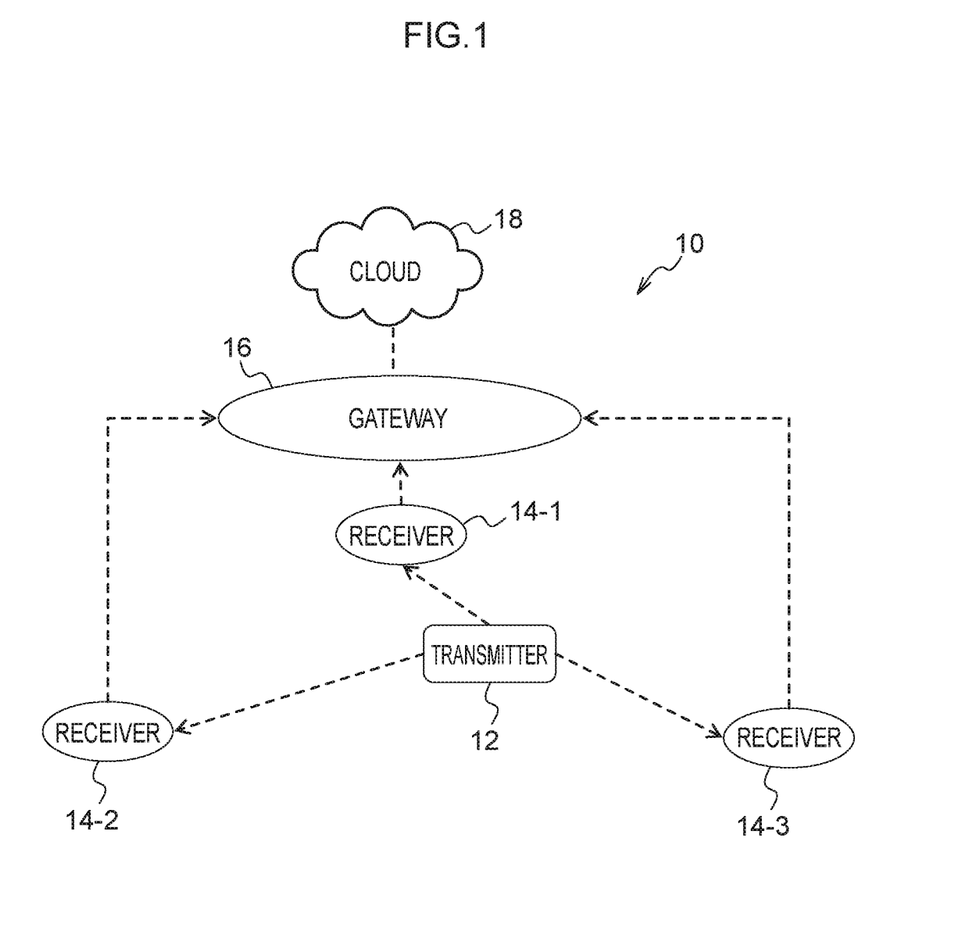
FIG. 1 is a block diagram showing a configuration of a position estimation system according to the first exemplary embodiment.

As shown in FIG. 1, a position estimation system 10 according to the exemplary embodiment includes a transmitter (beacon) 12, receivers (concentrators) 14-1, 14-2, and 14-3 (to be generically termed as "receivers 14" hereinafter), a gateway 16, and a cloud 18. The gateway 16 configures the "position estimation device" according to the present disclosure. In addition, the functions of the gateway 16, which will be described below may be implemented by a semiconductor device. In such case, the semiconductor device configures the "position estimation device".

The transmitter 12 is a beacon that transmits a radio wave in a predetermined frequency band via a transmission antenna (not shown), and is fixed in, for example, a tag form to a domestic animal. Identification information or the like based on a unique identification (ID) may be superimposed on the radio wave transmitted by the transmitter 12. The transmitter 12 may continuously or intermittently (periodically) transmit radio waves. This exemplary embodiment will exemplify one transmitter 12. Obviously, this is not exhaustive. A necessary number of transmitters 12 are arranged in accordance with the number of domestic animals or the like. Namely, in the exemplary embodiment, the number of transmitters 12 is singular or plural.

The receiver 14 receives the radio wave transmitted by the transmitter 12 via a reception antenna (not shown), and sends the RSSI value of the received radio wave to the gateway 16 via a transmission antenna (not shown). Although the present exemplary embodiment will be explained with a case in which the three receivers 14 are arranged, any number of receivers 14 may be arranged in accordance with a form of position estimation.

The gateway 16 receives the radio wave transmitted from each receiver 14 via a reception antenna (not shown). The gateway 16 calculates the distances between the respective receivers 14 and the transmitter 12 from the RSSI values included in the radio waves received from the respective receivers, and executes position estimation processing according to the exemplary embodiment (to be described later) to estimate and acquire the position of the transmitter 12 (the position of the domestic animal). The estimated and acquired information of the position of each domestic animal is sometimes transmitted to a host processing system such as the cloud 18 via the Internet. In a case in which position estimation processing are performed in the cloud 18, the gateway 16 aggregates the respective RSSI values, transmits the RSSI values to the cloud 18, and estimates a position based on the RSSI values received by a processing system in the cloud 18. In addition, a form using the cloud 18 may be configured to store RSSI values from, for example, the gateway 16 in the cloud 18 via the Internet, acquire the RSSI values by accessing the cloud 18 via a personal computer (PC), and perform position estimation processing (to be described below).

In the present disclosure, a communication scheme between the transmitter 12 and the receivers 14 and a communication scheme between the receivers 14 and the gateway 16 are not specifically limited. This exemplary embodiment uses, for example, a wireless smart utility network (Wi-SUN). Wi-SUN is a power-saving wireless communication standard for mutual communication within a maximum distance range of a little less than 1 km, and uses radio waves in sub-G of about 900 MHz.

Figure 9:
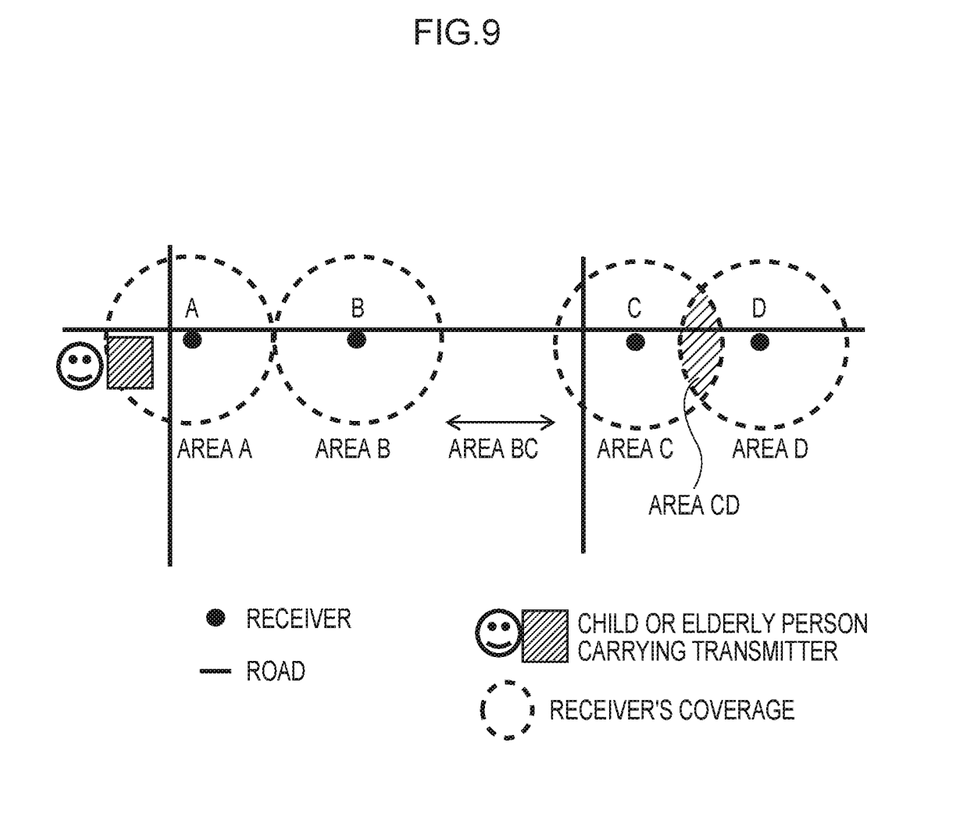
FIG. 9 is a view for explaining a basic position estimation system.

A basic method of performing position estimation of a search target using a transmitter (beacon) will be described next with reference to FIG. 9. FIG. 9 shows a basic position estimation system for children or elderly persons as search targets. The basic position estimation system shown in FIG. 9 is an example of a system in a case in which receivers A, B, C, and D are arranged along a road, and a child or elderly person (search target) carrying a transmitter that periodically transmits a radio wave moves along the road.

The basic position estimation system shown in FIG. 9 is an example of a position estimation system that uses no RSSI value and includes one receiver used for position estimation. That is, receivers A to D each send, to a gateway (not shown), information only indicating that a radio wave has been received from the transmitter. The gateway estimates the position of the search target on the basis of the reception information of a radio wave from each receiver. The respective receivers have predetermined ranges (the ranges indicated by the dotted line circles in FIG. 9) in which radio waves from the transmitter can be received. Referring to FIG. 9, the coverage of receivers A, B, C, and D are written as areas A, B, C, and D.

The basic position estimation system shown in FIG. 9 can perform position estimation in the following cases (Case 1 to 3) in accordance with the reception information of radio waves from the transmitters of receivers A to D. Namely, there is a case in which only one receiver has received radio wave from specific transmitter (Case 1). In such case, for example, the gateway receives information indicating that the receiver A has received a radio wave from a specific transmitter, the gateway estimates that the search target is located in area A. Secondly, there is a case in which plural receivers have received radio waves from specific transmitter (Case 2). In such case, for example, the gateway receives information indicating that receivers C and D have received radio waves from a specific transmitter, the gateway estimates that the search target is located in a region (area CD shown in FIG. 9) where areas C and D overlap each other. In this case, an estimated position in area CD can be further localized by comparing the RSSI values. Thirdly, there is a case in which no receiver has received radio wave from specific transmitter (case 3). In this case, it is possible to estimate the current position on the basis of the history of positions in the past. Assume that although no receiver has confirmed the reception of a radio wave from the specific transmitter, the receiver B had received a radio wave lastly (in the most recent past). In this case, the gateway estimates that the search target is located between areas B and C (area BC shown in FIG. 9) in which any receiver's coverages do not exist. This is because the search target is assumed to move along the road.

The position estimation system 10 according to this exemplary embodiment can be operated in accordance with the processes of the above basic position estimation system. However, a form using a position estimation system using RSSI values will be described below. The position estimation system 10 according to the exemplary embodiment performs correction processing predetermined in accordance with various combinations of RSSI values (measurement values) to improve the accuracy of position estimation. A basic position estimation method according to the exemplary embodiment will be described first.

The position estimation system 10 according to this exemplary embodiment is based on a method (to be referred to as "basic estimation processing" hereinafter) for estimating the position of a search target from three shortest distances obtained from RSSI values at the receivers at three positions. Basic estimation processing according to the exemplary embodiment will be described with reference to FIG. 2.

Figure 2:
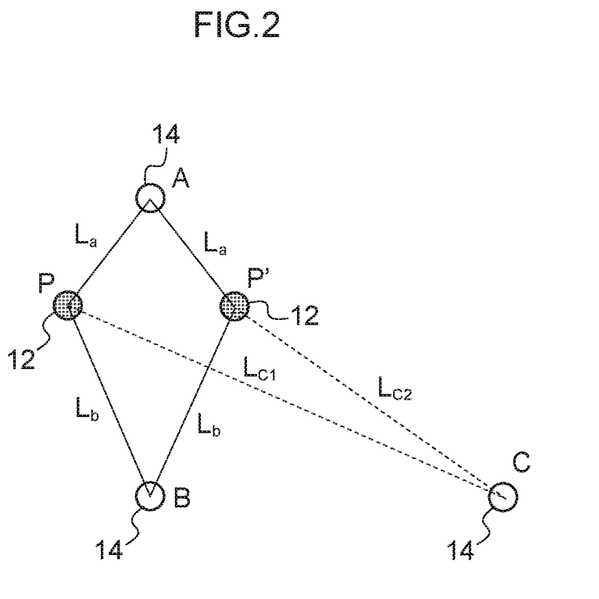
FIG. 2 is a view for explaining basic estimation processing according to an exemplary embodiment.

In basic estimation processing, first of all, the three receivers 14 are specified in ascending order of distance to a search target. Assume that, as shown in FIG. 2, the receivers 14 arranged at positions A, B, and C (the receivers 14 arranged at positions A, B, and C are referred to as "receiver A", "receiver B", and "receiver C", respectively hereinafter) are selected on the basis of the respective RSSI values. In this case, assume that La represents the distance between the receiver A and the transmitter 12, Lb represents the distance between the receiver B and the transmitter 12, and Lc represents the distance between the receiver C and the transmitter 12, and La<Lb<Lc, the distances being calculated from RSSI values.

First of all, computation focused only on receivers A and B is performed to estimate a position P (to be referred to as an "estimated point P" hereinafter) or a position P' (to be referred to as an "estimated point P'" hereinafter) as a position candidate of the transmitter 12. A distance Lc1 between the estimated point P and the receiver C and a distance Lc2 between the estimated point P' and the receiver C are calculated. Then, the differences between the respective calculated distances and Lc, that is, $\Delta 1 = c - Lc1$ and $662 = Lc - Lc2$ are obtained. One of the estimated points P and P' which corresponds to a smaller one of the differences 41 and $\Delta 2$ is estimated as the position of the transmitter 12. That is, in a case in which $\Delta 1 > \Delta 2$, P' is estimated as the position of the transmitter 12, that is, the position of the search target. In the present exemplary embodiment, a case in which the position of the transmitter 12 is estimated by selecting the receivers 14 that calculate three shortest distances, will described. However, not limited thereto, the receivers 14 may be selected to include the receiver 14 that has calculated a distance other than three shortest distances in consideration of the reliability and the like of the obtained distance.

Figure 3A:
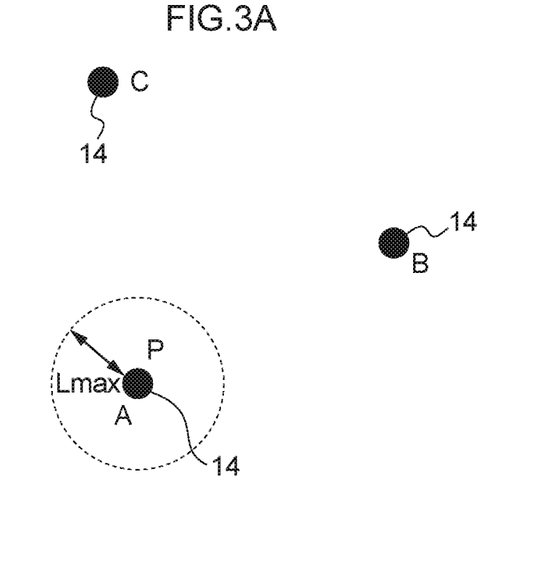
FIG. 3A is a view for explaining one-point estimation processing according to the first exemplary embodiment.
Figure 3B:
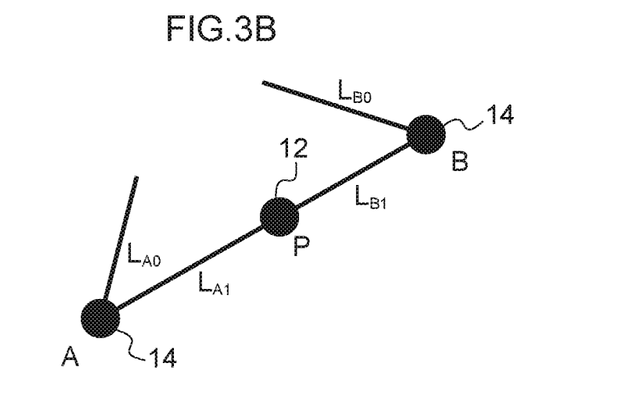
FIG. 3B is a view for explaining two estimated points correction processing according to the first exemplary embodiment.
Figure 3C:
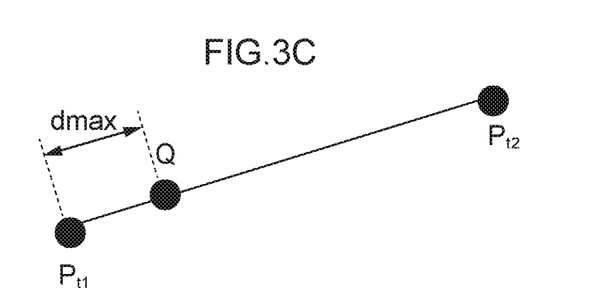
FIG. 3C is a view for explaining maximum movement distance limiting processing according to the first exemplary embodiment.

Correction processing according to the present exemplary embodiment will be described next with reference to FIGS. 3A to 3C. This correction processing is estimation processing other than basic estimation processing, which is executed in position estimation processing according to this exemplary embodiment on the basis of the characteristics, combinations, and the like of pieces of distance information acquired from RSSI values. Position estimation processing according to the exemplary embodiment is configured to improve the accuracy of position estimation by executing correction processing as compared with a case in which only basic estimation processing is executed. In position estimation processing according to the exemplary embodiment, three types of correction processing are executed as basic correction processing. Among these types of correction processing, FIG. 3A shows "one-point estimation processing" ("first correction processing"), FIG. 3B shows "two estimated points correction processing" ("second correction processing"), and FIG. 3C shows "maximum movement distance limiting processing" ("third correction processing").

One-point estimation processing will be described with reference to FIG. 3A. This correction processing is executed in a case in which one of plural distances calculated from RSSI values which is obtained from the specific receiver 14 is outstandingly small. In such a case, executing basic estimation processing will increase a calculation error since the distances from the remaining two receivers 14 are long, resulting in an increase in estimated point fluctuation (uncertainty range).

Accordingly, a threshold Lmax is provided for the distances from the receivers 14. In a case in which two or more points have been calculated as shown in FIG. 3A and in a case in which the shortest distance is smaller than the threshold Lmax, the position of the receiver 14 corresponding to the shortest distance is set as an estimated position (the estimated point P). Referring to FIG. 3A, although three distances are acquired by receivers A, B, and C, since the distance from the receiver A is smaller than the threshold Lmax, the position of the receiver A is set as the estimated point P.

Two estimated points correction processing (Second Correction Processing) will be described with reference to FIG. 3B. Referring to FIG. 3B, assume that $L_{A0}$ and $L_{B0}$ respectively represent the distances measured by the receivers A and B, and the distances $L_{A0}$ and $L_{B0}$ are the first and second shortest distances measured by the receivers 14 (to be sometimes referred to as "two shortest distance points" hereinafter). FIG. 3B shows a case in which the sum ($L_{A0}+L_{B0}$) of the respective distances is less than the distance between the receivers A and B (namely, a case in which it is impossible to form a triangle for estimating the position of the transmitter 12). Note that, in the following description, it is assumed that a necessary number of shortest distances have been selected as in the above case concerning the number of distances to be used.

In the case shown in FIG. 3B, the estimated points P and P' in FIG. 2 cannot be calculated. Such case may occur in a case in which the values of distances converted from RSSI values are relatively small. In this case, since the values of the distances $L_{A0}$ and $L_{B0}$ are small, an estimated point is likely to be located on a straight line connecting receivers A and B. Accordingly, the position obtained by prorating (proportionately dividing) the distance between the receivers A and B by the distances $L_{A0}$ and $L_{B0}$ is set as the estimated point P. Namely, in a case in which $L_{A1}$ denotes the distance between the receiver A and the estimated point P and $L_{B1}$ denotes the distance between the receiver B and the estimated point P, becomes $L_{A1}:L_{B1}=L_{A0}:L_{B0}$. Note that this two estimated points correction processing may be executed when the estimated point P cannot be calculated, occurs a predetermined number of times or more, in consideration of the probability of temporarily receiving fraudulent RSSI values due to the influences of noise and the like.

Maximum movement distance limiting processing (Third Correction Processing) will be described with reference to FIG. 3C. In this correction processing, a movement distance in consideration of the moving velocity of a search target is considered. Namely, in a case in which the position estimated at given time t1 is an estimated point $P_{t1}$, and the position estimated at time t2, that has elapsed by a predetermined time from time t1, is an estimated point $P_{t2}$, correction processing is provided so as to impose limitation on movement distance $d=|P_{t1}-P_{t2}|$ of a search target (the transmitter 12) from time $t_1$ to time $t_2$.

For example, in some cases, a large error occurs in an RSSI value due to the influences of noise and the like. Hence, using a movement distance d calculated from the RSSI value without any change may cause a large fluctuation of an estimated point. On the other hand, since a search target is known in advance, the moving velocity of the target can be predicted in advance. Accordingly, a limitation is imposed on the maximum movement distance of an estimated point, on the basis of a time difference (($t_2-t_1$) described above) between the times when RSSI values are acquired and the moving velocity of the search target. In this case, this limiting value is called the "maximum movement distance limiting value dmax".

FIG. 3C shows a case in which the estimated point $P_{t2}$ is estimated at time $t_2$ after the estimated point $P_{t1}$ is estimated at time $t_1$, and the distance between the estimated points $P_{t1}$ and $P_{t2}$ exceeds dmax. In this case, the estimated point $P_{t2}$ is not adopted, and an estimated point corresponding to the maximum movement distance limiting value dmax from the estimated point $P_{t1}$ is estimated as an estimated point Q. It is rational that the position of the estimated point Q in this case is located on a straight line connecting the estimated points $P_{t1}$ and $P_{t2}$. However, the present disclosure is not limited thereto. For example, any position within a radius dmax from the estimated point $P_{t1}$ may be estimated as the position of the estimated point Q in consideration of an obstacle.

Figure 4:
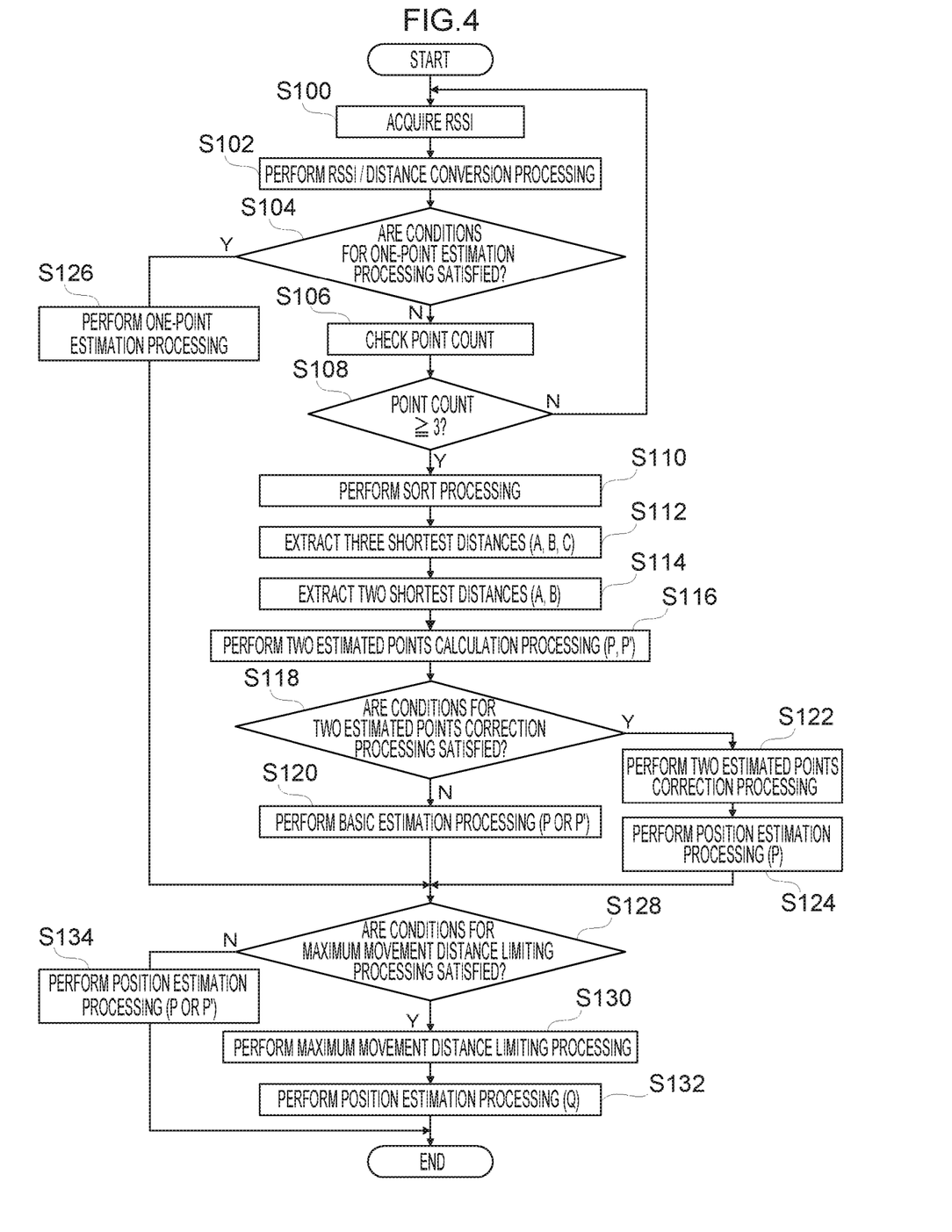
FIG. 4 is a flowchart showing a processing procedure based on a position estimation processing program according to the first exemplary embodiment.

Position estimation processing according to this exemplary embodiment will be described next with reference to FIG. 4. FIG. 4 is a flowchart showing a processing procedure based on a position estimation program executed by the gateway 16. The gateway 16 reads out this position estimation processing program from a storage means such as a central processing section (CPU) or read only memory (ROM), and executes the program upon expanding it in a work area such as a random access memory (RAM).

As shown in FIG. 4, in step S100, the gateway 16 acquires RSSI values from the respective receivers 14. In this case, for example, an acquisition period Ta may be set, and RSSI values acquired in the acquisition period Ta may be used in the following processing. The acquisition period Ta is periodically or non-periodically repeated. The following description is based a case in which a specific one transmitter 12 has transmitted a radio wave. In a case in which plural transmitters 12 have transmitted radio waves, the following processing is performed for each transmitter 12.

In step S102, the gateway 16 performs RSSI/distance conversion processing. That is, the gateway 16 calculates the distance from each receiver 14 to the transmitter 12 on the basis of the respective RSSI values.

In step S104, the gateway 16 determines whether conditions for one-point estimation processing (first correction processing) are satisfied. Namely, in step S104, the gateway 16 determines whether each calculated distance is equal to or less than the threshold Lmax. In a case in which affirmative determination has been made in step S104, the process proceeds to step S126 to execute one-point estimation processing. That is, the estimated point P shown in FIG. 3A is estimated as the position of the transmitter 12. The process then proceeds to step S128. In a case in which negative determination has been made in step S104, the process proceeds to step S106.

In step S106, the gateway 16 checks the number of receivers 14 (to be referred to as a "point count" hereinafter) that have converted RSSI values into distances.

In step S108, the gateway 16 determines whether the point count is three or more. If negative, the process returns to step S100 to repeat the processing from the acquisition of RSSI values in the next acquisition period Ta. If affirmative, the process proceeds to step S110.

In step S110, the gateway 16 executes sort processing. "Sort processing" according to this exemplary embodiment is the processing of sorting the respective receivers 14 in ascending order of distance.

In step S112, the gateway 16 extracts three shortest distance points (positions A, B, and C shown in FIG. 2) from the distances sorted in step S110.

In step S114, the gateway 16 further extracts two shortest distance points (positions A and B shown in FIG. 2) from the three points extracted in step S112.

In step S116, the gateway 16 executes two estimated points calculation processing. Two estimated points calculation processing according to this exemplary embodiment is the processing of calculating two estimated point candidates (P and P' in FIG. 2) as the intersection between distances from the two shortest distance points.

In step S118, the gateway 16 determines whether conditions for two estimated points correction processing are satisfied. In a case in which affirmative determination has been made in step S118, the process proceeds to step S122. In a case in which negative determination has been made in step S118, the process proceeds to step S120.

In step S122, the gateway 16 executes two estimated points correction processing (second correction processing), and in step S124, the gateway 16 performs the processing of estimating the estimated point P (see FIG. 3B) acquired as a result of executing the two estimated points correction processing as the position of the transmitter 12.

In step S120, the gateway 16 executes basic estimation processing to decide an estimated point (the estimated point P or P' shown in FIG. 2).

In step S128, the gateway 16 determines whether conditions for maximum movement distance limiting processing (third correction processing) are satisfied. In a case in which negative determination has been made in step S128, the process proceeds to step S134. In a case in which affirmative determination has been made in step S128, the process proceeds to step S130.

In step S130, the gateway 16 calculates the estimated point Q shown in FIG. 3C by executing maximum movement distance limiting processing. In step S132, the gateway 16 executes the processing of estimating the estimated point Q as the position of the transmitter 12. That is, the estimated point P or P' decided above is converted into the estimated point Q.

In step S134, the gateway 16 executes the processing of finally estimating the estimated point P or P' decided in step S120 as the position of the transmitter 12. The gateway 16 then terminates this position estimation processing program.

Figure 5:
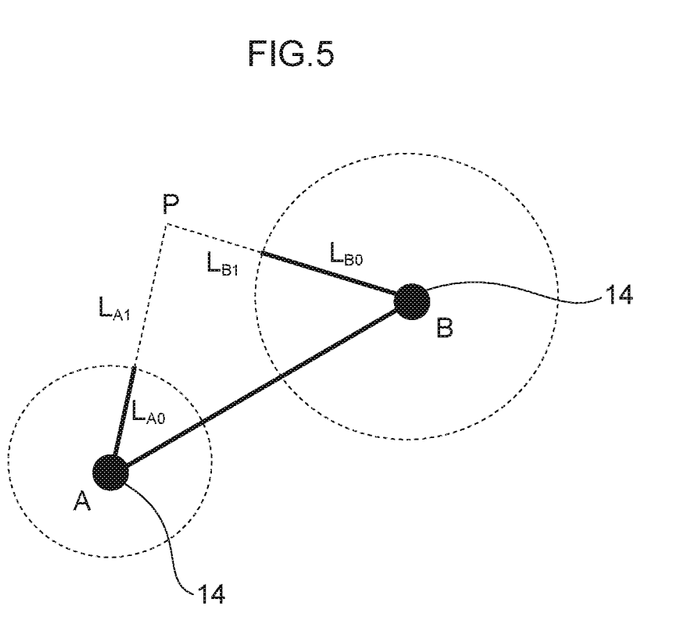
FIG. 5 is a view for explaining another form of two estimated points correction processing.

Another form of two estimated points correction processing (second correction processing) will be described with reference to FIG. 5. In this correction processing, the gateway 16 performs the processing of extending the distances $L_{A0}$ and $L_{B0}$ at the same magnification (equal magnification) as shown in FIG. 5, instead of prorating the distance between the receivers A and B in accordance with the distances $L_{A0}$ and $L_{B0}$. A rectangle ABP is then plotted by using an intersection P between extended $L_{A0}$ and $L_{B0}$ as the estimated point P. A length $L_{A1}$ of a side AP of the rectangle ABP is set as the distance between the receiver A and the estimated point P, and a length $L_{B1}$ of a side BP of the rectangle ABP is set as the distance between the receiver B and the estimated point P.

However, in a case in which the above correction processing is applied to all distance sets, an error in the estimated point P becomes large. For this reason, an upper threshold may be provided for the values of equal magnifications, so as to inhibit the execution of this correction processing when no triangle can be plotted beyond the threshold. In addition, it is estimated that a place where an estimated point cannot be calculated often occurs locally due to field conditions and the like. Accordingly, it should be noted that in a case in which there are not many places where it is estimated that estimated points cannot be calculated, estimated point fluctuations are smaller in a case in which this correction processing is not executed, than a case in which the processing is executed.

Note that the above two estimated points correction processing (second correction processing) can be regarded as the processing of placing an intersection on a straight line connecting receivers A and B as a result of the processing of extending the distances $L_{A0}$ and $L_{B0}$ at the same magnification. In this regard, the above two estimated points correction processing (second correction processing) can be regarded as a special case of another form of two estimated points correction processing.

In a case in which two estimated points correction processing (second correction processing) is continuously applied to, for example, a case in which the distances $L_{A0}$ and $L_{B0}$ are extremely small relative to the distance between the receivers A and B shown in, for example, FIG. 3B, errors in the estimated point P may be accumulated, and the uncertainty of the position may increase. That is, it is estimated that in some cases, errors are most likely to be accumulated in this processing among the three types of correction processing including the other cases described above. For this reason, two estimated points correction processing may be provided with a "correction mode" of executing this correction processing, and a "non-correction mode" of not executing the correction processing, such that the modes may be switched on the basis of count values obtained by counting the number of times in a case in which the correction processing is required and the number of times in a case in which the correction processing is not required.

To implement the above, count value N1 is obtained by counting the number of times a case in which any estimated point cannot be calculated as shown in FIG. 3B (a case in which YES is obtained in step S118 in FIG. 4) has consecutively occurred. For example, this counting process may be inserted between steps S118 and S122 in FIG. 4. On the other hand, counter value N2 is obtained by counting the number of times a case in which an estimated point can be calculated in the basic estimation processing (a case in which NO is obtained in step S118 in FIG. 4) has consecutively occurred. For example, this counting process may be inserted between steps S118 and S120 in FIG. 4. Thresholds N1th and N2th are respectively set for the counter values N1 and N2.

The initial mode is, for example, the non-correction mode. In a case in which N1≥N1th during the non-correction mode, the mode transitions to the correction mode. In contrast, in a case in which N2≥N2th during the correction mode, the mode transitions to the non-correction mode. Thus, setting mode transition in the two estimated points correction processing in the above manner restricts the accumulation of errors and further improves the accuracy of position estimation.

As has been described above in detail, the present exemplary embodiment implements the position estimation method, the position estimation device, and the position estimation system, including processings that may perform position estimation with higher accuracy in accordance with the characteristics of various types of measurement values.

[Second Exemplary Embodiment]

A position estimation method, a position estimation device, and a position estimation system according to the second exemplary embodiment will be described with reference to FIGS. 6 to 8. In the present exemplary embodiment, the number of receivers 14 is changed from three or more to two from the position estimation system 10 according to the first exemplary embodiment shown in FIG. 1. The same reference numerals denote the same constituent elements as those in FIG. 1, and a detailed description thereof will be omitted.

Figure 6:
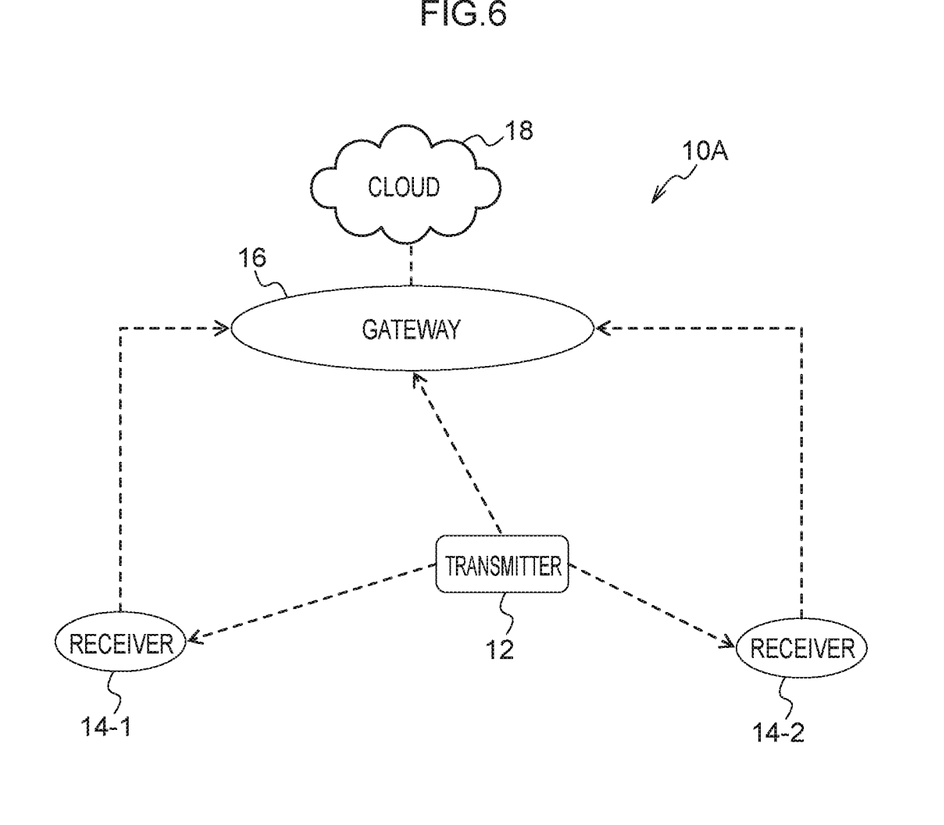
FIG. 6 is a block diagram showing a configuration of a position estimation system according to the second exemplary embodiment.

As shown in FIG. 6, a position estimation system 10A according to the present exemplary embodiment includes a transmitter 12, receivers 14-1 and 14-2, a gateway 16, and a cloud 18.

In some cases, RSSI values at three points cannot be obtained depending on how the receivers 14 are installed. In this case, basic estimation processing in the position estimation system 10 described above may not be possible. In the present exemplary embodiment, a case in which RSSI values at two points are acquired will be described.

Even in the above case, an estimated point can sometimes be specified by additionally using information about the installation field of the receiver 14 (a target area, that is, a region in which the transmitter 12 is estimated to exist) in addition to the RSSI values at the two points. As information about a target area, for example, a coordinate group or the like indicating the outer shape of the target area can be used.

A position estimation method according to this exemplary embodiment using RSSI values at two points and information about a target area will be described with reference to FIG. 7. Referring to FIG. 7, RSSI values from receivers A and B are acquired, and estimated point candidates P and P' are calculated in a previous step of basic estimation processing. Referring to FIG. 7, a rectangular target area S is also set. The target area S is set by, for example, the four vertices of a rectangle. This target area is not limited to a rectangle, and may have an arbitrary shape such as a circular or polygonal shape in accordance with an actual field.

Figure 7:
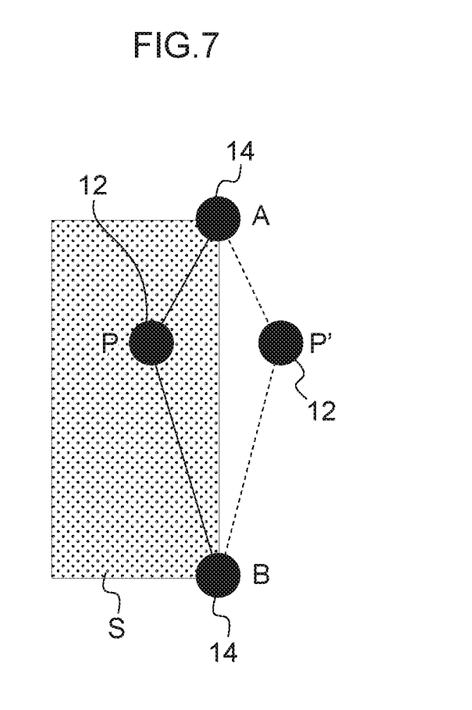
FIG. 7 is a view for explaining a position estimation method according to the second exemplary embodiment.

In the case shown in FIG. 7, "area exclusion processing" according to this exemplary embodiment is executed. In this processing, the positions of the estimated point candidates P and P' are compared with the target area S, and one of the estimated point candidates P and P' which is not included in the target area S is excluded from estimated points. In other words, this processing is executed to set, as an estimated point, one of the estimated point candidates P and P' which is included in the target area S. In the case shown in FIG. 7, the estimated point candidate P' is excluded, and the estimated point candidate P is decided as an estimated point.

Position estimation processing according to this exemplary embodiment will be described with reference to FIG. 8. FIG. 8 is a flowchart showing a processing procedure for a position estimation processing program according to the exemplary embodiment executed by the gateway 16.

Figure 8:
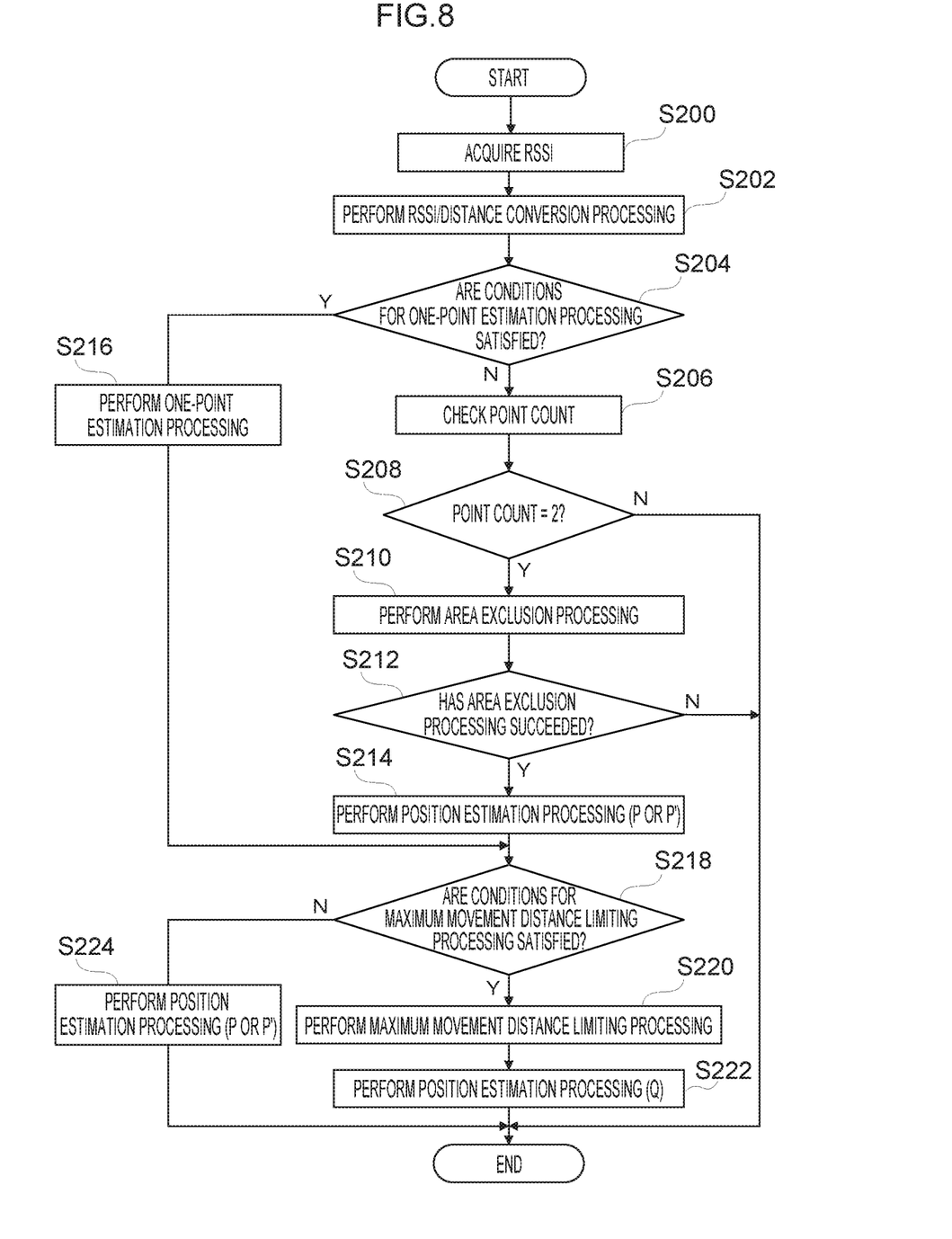
FIG. 8 is a flowchart showing a processing procedure based on a position estimation processing program according to the second exemplary embodiment.

The processing in steps S200 to S206 and S216 shown in FIG. 8 is the same as that in steps S100 to S106 and S126 shown in FIG. 4, and hence a detailed description thereof will be omitted.

In step S208, the gateway 16 determines whether the point count is two. In a case in which affirmative determination has been made in step S208, the process proceeds to step S210. In a case in which negative determination has been made in step S208, the gateway 16 terminates the position estimation processings.

In step S210, the gateway 16 executes the above area exclusion processing, and determines in step S212 whether the area exclusion processing has succeeded. In a case in which negative determination has been made in step S212, the gateway 16 terminates the position estimation processings. In a case in which affirmative determination has been made in step S212, the process proceeds to step S214. Note that the gateway 16 determines that area exclusion processing has failed, in a case in which any of the estimated point candidates P and P' cannot be decided as an estimated point in FIG. 7. FIG. 7 shows a case in which the estimated point candidate P is included in the target area S. However, the failure case occurs in a case in which the target area S does not to include both the estimated point candidates P and P'.

In step S214, the gateway 16 performs position estimation processing and decides one of the estimated point candidates P and P' shown in FIG. 7 as an estimated point.

Maximum movement distance limiting processing in steps S218 to S224 is the same as that in steps S128 to S134 shown in FIG. 4, and hence a description thereof will be omitted. Upon executing the maximum movement distance limiting processing in steps S218 to S224, the gateway 16 terminates the position estimation processing program.

As has been described above in detail, the position estimation method, the position estimation device, and the position estimation system according to the present exemplary embodiment may specify one estimated point by using information about a target area, even in a case in which RSSI values can be obtained from only the two receivers 14.

In the present exemplary embodiment, a case in which the area exclusion processing in step S212 fails, the position estimation processing program is terminated, has been described. However, the present disclosure is not limited to this. For example, an estimated point may enter the target area S as a result of further executing maximum movement distance limiting processing in and after step S218. In order to handle such a case, in a case in which negative determination has been made in step S212, the process may shift to step S218.

Note that, in the above exemplary embodiments, a case in which sub-G is used as the wireless communication system have been described. However, another frequency band, another wireless communication scheme or a wired communication scheme may be used. In addition, in the above exemplary embodiments, a case in which RSSI is used as a means for measuring the distance between the transmitter and each receiver, have been described. However, the present disclosure is not limited to this. Any another signal that allows the calculation of a distance may be used in the above exemplary embodiments.

In the above exemplary embodiments, a case in which the gateway estimates a position by using RSSI values from the respective receivers, have been described. However, the present disclosure is not limited to this. For example, the gateway may aggregate RSSI values, transmit them to a cloud, and a processing system in the cloud may estimate a position based on the received RSSI values. In addition, for example, the gateway may store RSSI values in a cloud via the Internet, and a PC may access the cloud to acquire the RSSI values and may estimate a position.

In the above description, the first and the second exemplary embodiments have been explained in independent forms. However, the present disclosure is not limited to this. The respective forms may be combined. For example, in FIG. 8, a case in which, upon determination in step S208 that the point count is not two, the gateway 16 terminates the position estimation processings, has been described. However, further determination of whether the point count is three or more may be executed and the processing described in after step S108 in FIG. 4 may be executed.

Although FIGS. 4 and 8 each show the flowchart for the position estimation processing according to the above exemplary embodiments, the processing procedure is not limited to this. Some steps may be interchanged or omitted. For example, although the first correction processing, the second correction processing, and the third correction processing are executed in the order named in the above description, the respective types of processing may be interchanged such that the second correction processing, the third correction processing, and the first correction processing are executed in this order, and one-point estimation processing may be performed for final confirmation.

What is claimed is:

1. A position estimation method comprising:
acquiring, from a plurality of receivers that receive a plurality of received signal strengths of radio waves transmitted from a transmitter and transmit the plurality of received signal strengths, the plurality of received signal strengths;
in a case in which a plurality of distances between the transmitter and the plurality of receivers are calculated based on the plurality of received signal strengths, and a position of the transmitter is estimated by using the plurality of distances, and in a case in which a distance among the plurality of distances is smaller than a predetermined threshold, performing a first correction processing by estimating a position of a receiver from among the plurality of receivers corresponding to the distance smaller than the predetermined threshold as a position of the transmitter; and
in a case in which the position of the transmitter is estimated by using three shortest distances of the plurality of distances, and a sum of two arbitrary distances of the three shortest distances is less than a distance between two receivers from among the plurality of receivers corresponding to the two arbitrary distances, performing a second correction processing by estimating an intersection obtained by extending the two arbitrary distances with a same magnification as the position of the transmitter.

2. The position estimation method according to claim 1, wherein the intersection is a position obtained by proportionately dividing a straight line that connects the two receivers.

3. The position estimation method according to claim 1, further comprising:
in a case in which a distance between a first position estimated at a first time and a second position estimated at a second time, which the second time is a predetermined time elapsed from the first time, exceeds a predetermined maximum movement distance, performing a third correction processing by estimating a position separated from the first position by the predetermined maximum movement distance as the position of the transmitter.

4. The position estimation method according to claim 3, wherein a position that is located on a straight line connecting the first position and the second position and is separated from the first position by the predetermined maximum movement distance is estimated as the position of the transmitter.

5. The position estimation method according to claim 1, wherein the position of the transmitter is estimated by using information indicating a predetermined region in which the transmitter is estimated to exist and two distances from among the plurality of distances.

6. The position estimation method according to claim 5, wherein:
the two distances are two shortest distances of the plurality of distances; and
one of two position candidates of the transmitter calculated by using the two shortest distances included in the predetermined region is estimated as the position of the transmitter.

7. A position estimation device comprising:
a reception device configured to acquire, from a plurality of receivers that receive a plurality of received signal strengths of radio waves transmitted from a transmitter and transmit the plurality of received signal strengths, the plurality of received signal strengths; and
an estimation device configured to calculate a plurality of distances between the transmitter and the plurality of receivers based on the plurality of received signal strengths, and estimate a position of the transmitter by using the plurality of distances,
wherein, in a case in which a distance among the plurality of distances is smaller than a predetermined threshold, the estimation device is configured to perform a first correction processing by estimating a position of a receiver from among the plurality of receivers corresponding to the distance smaller than the predetermined threshold as a position of the transmitter, and
in a case in which the position of the transmitter is estimated by using three shortest distances of the plurality of distances, and a sum of two arbitrary distances of the three shortest distances is less than a distance between two receivers from among the plurality of receivers corresponding to the two arbitrary distances, the estimation device is configured to perform a second correction processing by estimating an intersection obtained by extending the two arbitrary distances with a same magnification as the position of the transmitter.

8. A position estimation system comprising:
a transmitter configured to transmit a radio wave;
a plurality of receivers each configured to receive the radio wave, acquire a received signal strength of the radio wave, and transmit the acquired received signal strength;
a reception device configured to receive a plurality of received signal strengths transmitted from the receivers; and
an estimation device configured to calculate a plurality of distances between the transmitter and the plurality of receivers based on the plurality of received signal strengths, and estimate a position of the transmitter by using the plurality of distances,
wherein, in a case in which a distance among the plurality of distances is smaller than a predetermined threshold, the estimation device is configured to perform a first correction processing by estimating a position of a receiver from among the plurality of receivers corresponding to the distance smaller than the predetermined threshold as a position of the transmitter, and
in a case in which the position of the transmitter is estimated by using three shortest distances of the plurality of distances, and a sum of two arbitrary distances of the three shortest distances is less than a distance between two receivers from among the plurality of receivers corresponding to the two arbitrary distances, the estimation device is configured to perform a second correction processing by estimating an intersection obtained by extending the two arbitrary distances with a same magnification as the position of the transmitter.

* * * * *